Nov. 11, 1930.  W. B. TEN EYCK  1,780,953
CONDUCTOR
Filed March 25, 1925
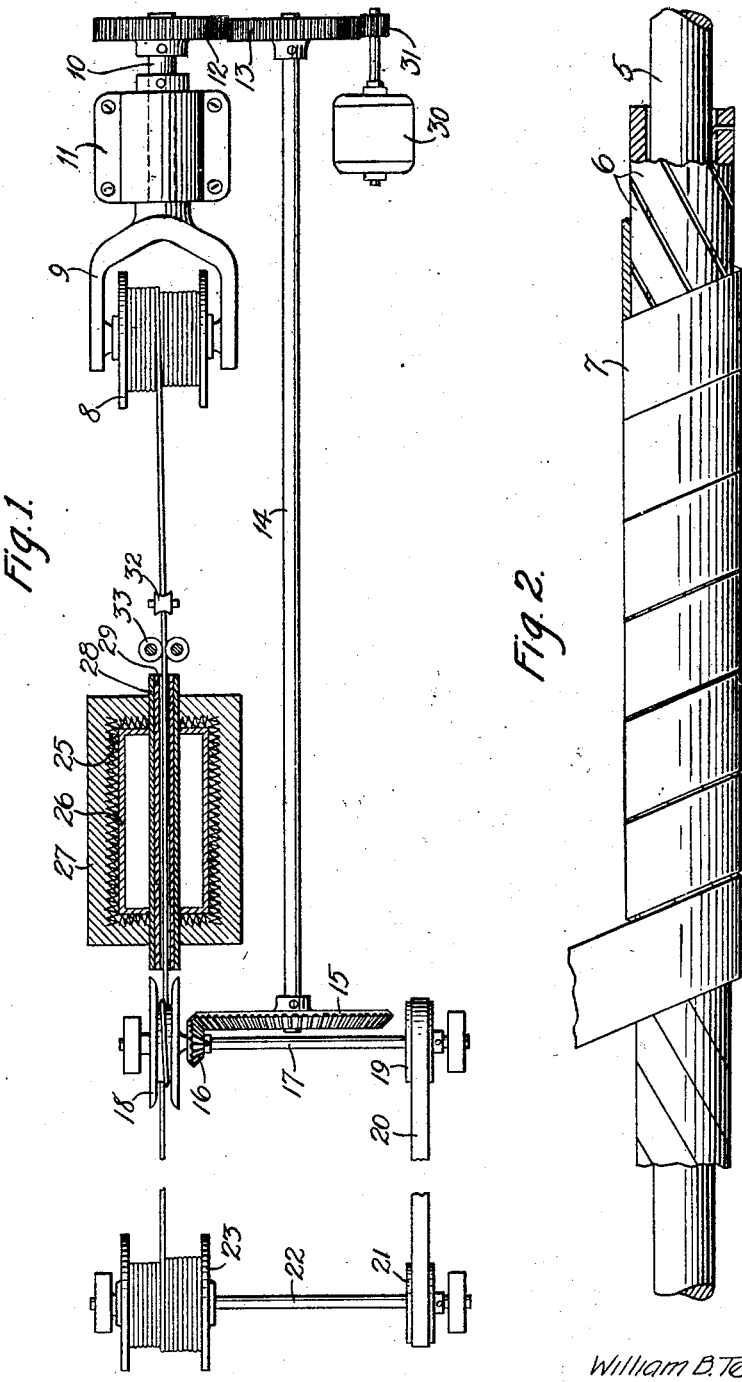
Inventor
William B. Ten Eyck, deceased
Christine Z. Ten Eyck
his Administratrix.
by  E. W. Adams  Att'y.

Patented Nov. 11, 1930

1,780,953

UNITED STATES PATENT OFFICE

WILLIAM B. TEN EYCK, DECEASED, BY CHRISTINE Z. TEN EYCK, ADMINISTRATRIX, OF MONTCLAIR, NEW JERSEY, ASSIGNOR, BY MESNE ASSIGNMENTS, TO WESTERN ELECTRIC COMPANY, INCORPORATED, A CORPORATION OF NEW YORK

CONDUCTOR

Application filed March 25, 1925. Serial No. 18,333.

This invention relates to conductors for the transmission of electrical energy and more particularly to a method of constructing a signaling conductor having an external layer of a material of high permeability for the purpose of increasing the inductance of the conductor.

One manner of increasing the inductance of a conductor employed for the transmission of alternating current is to wrap the conductor spirally with a layer of wire or tape of magnetic material. This method is known in the art as continuous inductive loading as distinguished from lump loading by means of inductance coils distributed at intervals along the conductor. Until recently iron has been considered to be the only material suitable for continuous loading but it has now been discovered that a more suitable material may be procured in the form of an alloy of nickel and iron. When these two metals are combined in the proper proportions and the resulting alloy is given a proper heat treatment, a material having a very high permeability at low magnetizing forces is obtained.

One form of this material which has been used in a submarine cable comprises 78½% nickel and 21½% iron. Alloys of nickel and iron having similar characteristics, especially high permeability at low magnetizing forces, have been entitled "permalloys". Other properties possessed by these alloys which increase their value as a loading material are a hysteresis loss lower than that of iron and a high resistivity, both properties being conducive to increasing the efficiency of the cable by lowering the effective resistance of the conductor. When it was attempted to employ this material in the form of a tape for continuous loading, difficulties were encountered. It was found that if the permalloy tape was first heated and then cooled before applying to the conductor, internal stresses were set up upon bending of the tape, causing the permeability to be very materially lowered. This difficulty was overcome by applying the tape to the conductor before giving the tape the heat treatment and then subjecting the taped conductor to the heating and cooling necessary to produce high permeability in the loading material.

Further difficulty, however, was experienced in that the permeability of the loading material was lowered by what appeared to be adhesion between the copper conductor and the loading tape. It is believed that this adhesion occurs when the taped conductor is subjected to the high temperatures necessary for the proper heat treatment and that upon subsequent cooling the tape is subjected o stresses which cause a lowering of its permeability.

In the construction of a loaded conductor it has been the practice to wrap a layer of magnetic material, comprising a nickel-iron alloy, closely around the conductor consisting of a central copper wire surrounded by six flat copper strands, the whole making a compact structure with very little space not occupied by metal. To give the loading material the desired magnetic characteristics, this conductor was heated to approximately 850° C. and then cooled at a preferred rate. On heating, both metals expand but the copper, because of its higher temperature coefficient, expands more than the loading material with the result that it presses tightly against the loading material when the conductor is at the high temperature and if the structure is a fairly tight one, the magnetic tape is stretched, an elongation of as much as 1% having been observed. This stretching has apparently no direct effect on the magnetic properties since it occurs at a temperature above the magnetic transformation point but it does show effects of high pressure between the metals. At the temperature of 850° C. both metals are relatively soft and since they are forced together by thermal expansion there is a tendency for the loading material to weld to the copper, the extent to which the metals are welded depending on several factors such as the tightness of the copper structure and the character of the metal surfaces. In this connection it has been noted that although the loading material welds to the copper, welding of the copper strands to the central wire has very rarely been observed and no welding has been observed between layers of the loading material when more than one layer has been used. These results suggest that welding is possibly not a simple case of fusion of the two metals but some effect brought about by chemical action.

On cooling, the copper conductor contracts more than the magnetic tape. No doubt some of the welds which have been formed break loose when this contraction occurs but the stronger ones hold with the result that the magnetic tape is at points pulled down with the copper and parts of it are bent, stretched or compressed depending upon the particular accidental conditions of adherence. Even though the forces involved may be very small, the stresses at points in the tape may be of considerable magnitude producing a strain sufficient to reduce the permeability at spots to a very small fraction of that which the tape would have had if not subjected to such strain. The resultant conductor, therefore, is one which although it may have fairly uniform inductance as measured from foot to foot is loaded with a material which varies in permeability over a wide range in points separated by a fraction of an inch.

The copper tapes upon being stranded about the central conductor do not present a true cylindrical surface since the edges of the tape do not lie in close contact with the central conductor but present spiralled edges. As the cooling proceeds, therefore, a sticking or welding of the material may occur at various points along these edges and the subsequent contraction of the copper set up stresses in the alloy tape.

During the cooling portion of the heat treatment the alloy tape may cool more rapidly at first than does the copper conductor due to its intimate contact with the cooling medium so that the alloy tape quickly comes into intimate contact with the copper strands.

Whatever may be the true explanation for the difficulty experienced, it has largely been overcome by providing a small air space between the layer of loading material and the signaling conductor when the loading material is applied. This method of obtaining high permeability is described at length in patent to G. W. Elmen, No. 1,586,887, granted June 1, 1926.

Instead of providing an air space between the conductor and the tape, as the latter is wound in position, the desired result may be obtained by placing a layer of paper upon the conductor before the loading material is wound thereon. This layer of paper is burned out during the subsequent heat treatment thus giving the desired spacing between the loading material and the conductor. This method is described in detail in patent to W. B. Ten Eyck, No. 1,586,862, granted June 1, 1926.

An object of the present invention is to provide for the practical loading of a signaling conductor with magentic material which requires heat treatment to develop its maximum permeability and whose characteristics are subject to undesired change under applied stresses.

Another object of the invention is to provide a method of applying magnetic loading material to an electrical conductor and subjecting it to heat treatment in such a manner as to prevent the setting up of deleterious stresses.

To accomplish these objects the invention contemplates the method of applying a loading material to an electrical conductor in which the loading material and conductor are spaced apart during the heat treatment so as to avoid obtaining low or variable values of permeability. This invention is in the nature of an alternative to those disclosed in the above mentioned patents to G. W. Elmen and W. B. Ten Eyck. Each of these inventions has certain advantages over the others as will be apparent from a consideration of the several patents.

The invention may be more clearly understood by reference to the accompanying drawing in which Fig. 1 is a plan view showing one method of carrying out the invention, and Fig. 2 is a view of a loaded conductor prepared in accordance with the features of the invention.

Referring now more particularly to Fig. 2, the conductor comprises a central conductor core 5 about which are spirally wrapped a plurality of conducting strands 6—6 which preferably are so shaped as to provide a smooth exterior surface. About this composite conductor is wrapped a layer of magnetic loading material 7 which is positioned with a spiral lay opposite to that of the conducting strands 6—6.

To prevent adhesion between the conducting strands and the loading material during the subsequent heat treatment the loaded conductor is twisted while subjected to the high temperatures in the manner disclosed in Fig. 1. Supply reel 8 upon which the loaded conductor is wound as it is received from the serving machine, is mounted in the forked support 9, the rotatable shaft 10 of which is supported by a suitable bearing 11. Upon the end of shaft 10 there is securely fixed a gear 12 which is adapted to mesh with a similar gear 13, rigidly secured to a shaft 14 upon the opposite end of which is mounted a bevelled gear 15. This gear meshes with a bevel pinion 16 mounted on the shaft 17 which also carries the capstan 18 and a pulley 19. A belt 20 passing over pulley 19 and a similar pulley 21 on shaft 22 is arranged to rotate the reel 23 upon which the loaded conductor is to be wound after subjecting it to the heat treatment.

The furnace which is of the muffle type comprises heating elements 25 which are located between the fire clay muffle 26 and the fire brick 27. The iron tube 28 has a copper lining 29 of such small inside diameter as to prevent rapid circulation of air which might cause an objectionable degree of oxidization of the permalloy tape. For the sake of clearness this apparatus has been shown schematically but reference is made to an application of F. S. Kochendorfer, Serial No. 601,021, filed November 15, 1922, matured into Patent No. 1,624,668 on April 12, 1927, and which discloses the preferred form of apparatus to be used.

The shaft 14 is rotated by means of a motor 30 upon the shaft of which is a pinion 31 engaging gear 13 and since capstan 18 and shaft 10 are both positively driven from shaft 14, the reel 8 is rotated positively with respect to the linear travel of the conductor through the furnace. In practice when the copper conductor is of No. 5 B. and S. gauge, it has been found satisfactory to have the gear ratio such that the reel 8 is rotated one complete revolution for a conductor travel of four feet. Two sets of pulleys 32 and 33 are provided to guide the conductor into the furnace without causing undue strain. These pulleys may be eliminated by flaring the end of the tube 28. As the loaded conductor passes through the furnace, the direction of rotation of reel 8 is such that the length of conductor extending between reel 8 and capstan 18 is twisted in such a direction that the copper strands 6—6 are tightened upon the central core 5 and since the magnetic tape is wound with the opposite direction of lay, this tape is loosened and a slight spacing therefore occurs between the tape and the conducting strands while the conductor is subjected to the heat treatment thus preventing adhesion which might otherwise take place between the tape and core.

Referring again to Fig. 2, at the right hand portion there is shown somewhat exaggerated the relationship of the magnetic tape and composite conductor before twisting and at the left hand portion of this figure is shown the condition when the conductor is twisted thereby causing the conducting strands to wrap closer to the central core and causing the magnetic tape to be loosened slightly.

As a result of the slight spacing caused from the loosening of the tape and the tightening of the conducting strands, the trouble heretofore experienced due to adhesion between the magnetic tape and the conductor is largely overcome and the high inductance of the loaded conductor is therefore maintained.

What is claimed is:

1. The method of constructing a continuously loaded conductor which comprises wrapping a layer of magnetic loading material about a conducting core, heat treating the loaded conductor to develop high permeability, and twisting the loaded conductor while it is undergoing said heat treatment.

2. The method of constructing a loaded conductor which comprises wrapping a plurality of conducting strands about a central core, wrapping a layer of magnetic loading material about the composite conductor in an opposite direction, heat treating the loaded conductor to develop high permeability, and twisting the loaded conductor while it is undergoing said heat treatment in the direction to loosen the layer of magnetic material.

3. The method of constructing a continuously loaded conductor which comprises wrapping a plurality of conducting strands about a central conducting core, wrapping a layer of loading material about the composite conductor with a direction of lay opposite to that of the conducting strands, heat treating the loaded conductor to develop high permeability and twisting the loaded conductor while it is being heat treated in a direction to tighten the copper strands about the central core.

4. The method of constructing a continuously loaded conductor which comprises wrapping a plurality of conducting strands about a central conducting core, wrapping a layer of loading material about the composite conductor with a direction of lay opposite to that of the conducting strands, heat treating the loaded conductor to develop high permeability, and twisting the loaded conductor while it is being heat treated in a direction to tighten the copper strands about the central core and loosen the loading material about the conducting strands.

5. The method of constructing a continuously loaded conductor which comprises wrapping a plurality of conducting strands about a central conducting core of approximately No. 5 B. and S. gauge, wrapping a layer of loading material about the composite conductor with a direction of lay opposite to that of the conducting strands, heat treating the loaded conductor to develop high permeability, and providing a uniform twist to the conductor as it is being heat treated by rotating the conductor one revolution for approximately every four foot of conductor travel.

6. The method of constructing a stranded loaded conductor which comprises helically applying to the conductor a loading material requiring heat treatment after its application to develop its magnetic characteristics with such a relation between the lay of the strands of the conductor and the lay of the applied loading material that the loading material may be loosened by twisting the loaded conductor, and then twisting the loaded conductor to effect loosening to such an extent as to reduce the strains to which the heat treatment would subject the leading material.

7. The method of constructing a loaded conductor which comprises wrapping a plurality of conducting strands about a central core, wrapping a layer of magnetic loading material about the composite conductor in an opposite direction, then twisting the loaded conductor to loosen the layer of magnetic material and heat treating to develop high permeability.

8. The method of constructing a continuously loaded conductor which comprises wrapping a plurality of conducting strands about a central conducting core, wrapping a layer of loading material about the composite conductor with a direction of lay opposite to that of the conducting strands, then twisting the loaded conductor in a direction to tighten the conducting strands about the central core and heat treating to develop high permeability.

9. The method of constructing a continuously loaded conductor which comprises wrapping a plurality of conducting strands about a central conducting core, wrapping a layer of loading material about the composite conductor with a direction of lay opposite to that of the conducting strands, then twisting the loaded conductor in a direction to tighten the copper strands about the central core and loosen the loading material about the conducting strands, and heat treating the loaded conductor to develop high permeability.

10. The method of constructing a continuously loaded conductor which comprises wrapping a layer of magnetic loading material about a conducting core, and simultaneously subjecting the loaded conductor to a heat treatment and to a mechanical force to develop one of its electrical characteristics.

11. In a method of constructing a continuously loaded stranded conductor, the step of wrapping a layer of magnetic material about a stranded conducting core, followed by the steps of heat treating the loaded conductor to develop one of its electrical characteristics and reducing the diameter of said stranded core by twisting it to prevent deleterious effects of said heat treatment.

In witness whereof, the said Christine Z. Ten Eyck, administratrix, hereunto subscribes her name this 16th day of March, A. D. 1925.

CHRISTINE Z. TEN EYCK,
*Administratrix of the Estate of William B. Ten Eyck, Deceased.*